United States Patent
Miyauchi

(10) Patent No.: US 7,316,362 B2
(45) Date of Patent: Jan. 8, 2008

(54) SPRAYING ANGULAR VARIABLE WASHER NOZZLE DEVICE

(75) Inventor: Kiyoshi Miyauchi, Shizuoka (JP)

(73) Assignee: Nippon Vinylon Co., Ltd., Shizuoka (JP)

( * ) Notice: Subject to any disclaimer, the term of this patent is extended or adjusted under 35 U.S.C. 154(b) by 379 days.

(21) Appl. No.: 11/069,981

(22) Filed: Mar. 3, 2005

(65) Prior Publication Data

US 2006/0043110 A1    Mar. 2, 2006

(30) Foreign Application Priority Data

Aug. 26, 2004    (JP)    .............................. 2004-246539

(51) Int. Cl.
  B05B 1/08    (2006.01)
  B05B 1/10    (2006.01)
  B05B 15/08    (2006.01)
(52) U.S. Cl. ................................ 239/102.1; 239/284.1; 239/284.2; 239/587.1; 239/587.4; 239/587.5; 239/589.1
(58) Field of Classification Search .............. 239/102.1, 239/284.1, 284.2, 587.1, 587.5, 587.4, 589.1
See application file for complete search history.

(56) References Cited

U.S. PATENT DOCUMENTS

| | | | | | |
|---|---|---|---|---|---|
| 2,772,115 | A | * | 11/1956 | Stanley | 239/284.1 |
| 2,898,036 | A | * | 8/1959 | Newill | 239/110 |
| 3,433,416 | A | * | 3/1969 | Bauer et al. | 239/284.1 |
| 6,296,198 | B1 | * | 10/2001 | Tores | 239/284.1 |
| 6,360,969 | B1 | * | 3/2002 | Egner-Walter et al. | 239/284.1 |
| 6,626,377 | B1 | * | 9/2003 | Vogt | 239/284.1 |

FOREIGN PATENT DOCUMENTS

JP    2002-067888    3/2002

* cited by examiner

*Primary Examiner*—Davis Hwu
(74) *Attorney, Agent, or Firm*—Wenderoth, Lind & Ponack, L.L.P.

(57) ABSTRACT

A spraying angular variable washer nozzle device is formed by press fitting and fixing a spraying nozzle in a device body. In order to prevent leakage of a cleaning fluid and regulate the spraying angle, the spraying nozzle is provided with a nozzle body and a nozzle support. The nozzle body includes a spraying flow passage, and the nozzle support includes a recessed housing in which the nozzle body is inserted and fixed. The spraying nozzle is supported rotatably in a fitting hole of a head portion of the device body. The recessed housing is provided with an opening at a fluid supply side thereof, and an ejection port for spraying the spraying fluid from the nozzle body at a bottom section thereof.

3 Claims, 4 Drawing Sheets

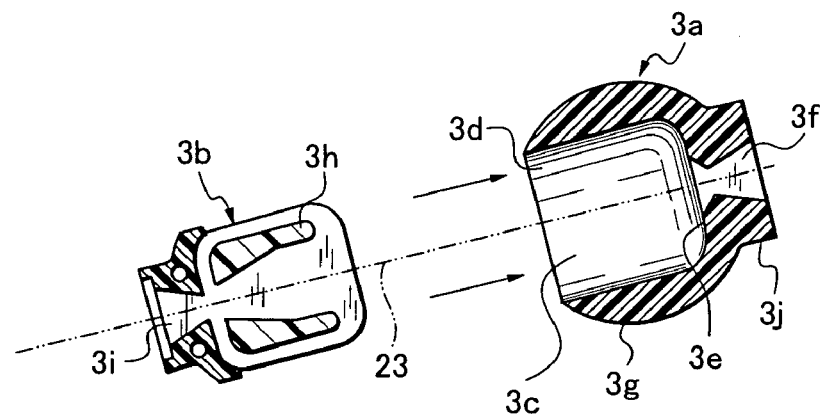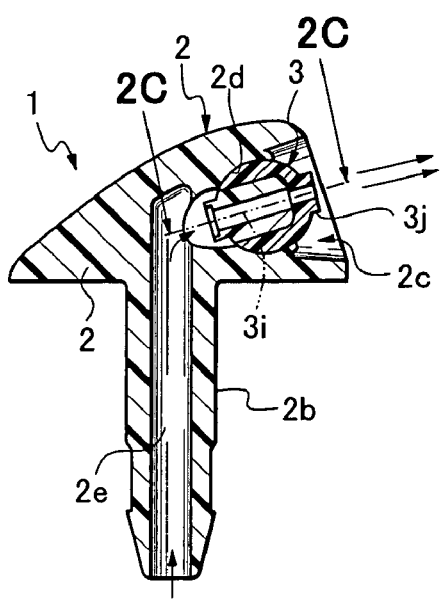

SPRAYING ANGULAR VARIABLE WASHER NOZZLE DEVICE

BACKGROUND OF THE INVENTION

1. Field of the Invention

The present invention relates to a spraying angular variable washer nozzle device adapted to spray a cleaning fluid onto a windshield such as automobile.

2. Related Art

As shown in FIGS. 4A and 4B, a conventional washer nozzle device A is provided with a body 20 with a head portion 20a opened at one end with a recess for fitting a nozzle at the opening 21, and a nozzle 22 having a selfgenerating oscillation flow passage press-fitted in the recess (refer to JP-A-2002-67888). From an ejection port 22a of the nozzle 22, a cleaning fluid is sprayed onto the windshield so as to oscillate laterally with respect to an axis 23 of the ejection port 22a of the nozzle 22.

However, the nozzle 22 of such a washer nozzle device A is made of a combination of two divisional members which are press-fitted from the opening 21 into the interior of the recess of the head portion 20a. Since the head portion 20a and nozzle 22 are all formed out of a synthetic resin, they have errors and fine recesses and projections on the surfaces, so that the cleaning fluid from a fluid supply passage 20b shown in FIG. 4B leaks out from the contact surface 22b of the nozzle 22 shown in FIG. 4A. This fluid leaks to the outside from a place in the device other than the ejection port 22a in some cases. It is difficult to perfectly seal the head portion and nozzle in an air tight manner It is possible that the nozzle body press-fitted into the head portion will be worked loose by the cleaning fluid. Specifically, the cleaning fluid forces the nozzle body to the outside and thus causes the nozzle body to come off from the recess. Moreover, the angle of spraying of the cleaning fluid is fixed, and cannot be set freely in accordance with the kind of vehicle in which the device is installed.

SUMMARY OF THE INVENTION

The spraying angular variable washer nozzle device according to the present invention aims at solving these problems.

To solve these problems, the present invention provides a spraying angular variable washer nozzle device including a device body having a suction pipe portion adapted to suck in a cleaning fluid, and a head portion adapted to spray the cleaning fluid; and a spraying nozzle supported rotatably in a fitting hole formed at one end of the head portion The spraying nozzle is provided with a nozzle body having a spraying flow passage, and a nozzle support having a recessed housing in which the nozzle body is inserted and fixed The nozzle support is supported rotatably in the fitting hole of the head portion of the device body and the recessed housing is provided with an opening at the side where the cleaning fluid is supplied, and an ejection port at its bottom section for spraying the cleaning fluid from the nozzle body.

It is preferable that the spraying flow passage be formed as a self-generating oscillation flow passage so that the cleaning fluid is automatically sprayed over a wide range. It is preferable that the nozzle support comprise a spherical member having an axis extending through the centers of the opening of the recessed housing and the ejection port, and that the nozzle fitting hole of the device body be provided with a spherical recess in which the spherical member is rotatably fitted. When the spraying nozzle is thus fitted and supported, it becomes possible to regulate (adjust) the spraying nozzle to an arbitrary angle within a certain range, and spray the cleaning fluid over a wide range.

In the spraying angular variable washer nozzle device according to the present invention, the opening of the recessed housing for the nozzle support is provided at the fluid supply side. Therefore, because the nozzle body is press-fitted from the fluid supply side to the ejection port side, the nozzle body is inserted fixedly in the nozzle support. Accordingly, the cleaning fluid is sprayed wholly from the ejection port through the nozzle body without leaking from a narrow clearance between the nozzle body and nozzle support.

Further, there is no possibility for the nozzle body which is press-fitted in the nozzle support housing to be loosened by the pressure of the cleaning fluid and thus come off from the nozzle support housing.

Also since the nozzle support body is fitted and supported in the spherical member in the spherical recess of the device body, the spraying direction can be set freely both vertically and laterally.

BRIEF DESCRIPTION OF THE DRAWING

FIG. 2A is an exploded cross sectional view of the spraying nozzle in the same spraying angular variable washer nozzle device;

FIG. 2B is a longitudinal sectional view of the same spraying angular variable washer nozzle device;

FIG. 2C is a sectional view taken along the line 2C-2C indicated by arrows in FIG. 2B;

DETAILED DESCRIPTION OF PREFERRED EMBODIMENT

Figure 1:
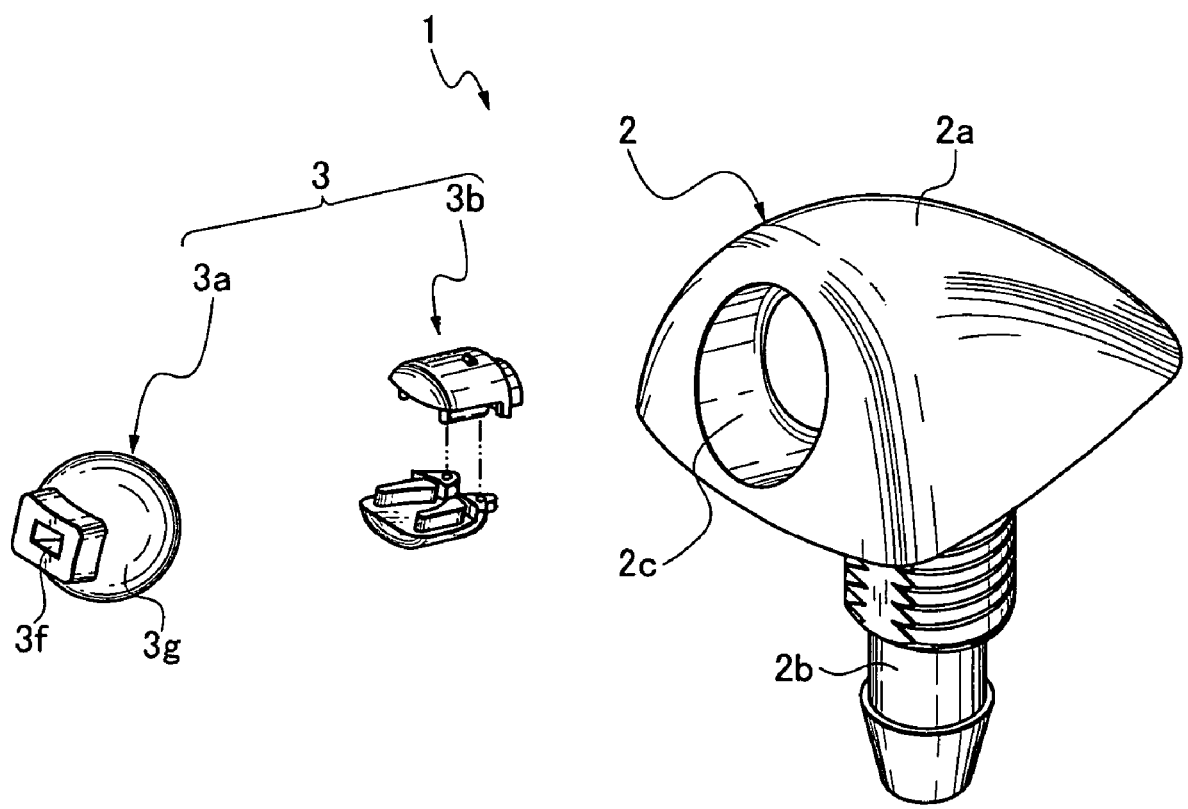
FIG. 1 is an exploded perspective view of the spraying angular variable washer nozzle device according to the present invention.

A spraying angular variable washer nozzle device 1 according to the present invention includes, as shown in FIG. 1, a body 2 of a synthetic resin made of a suction pipe portion 2b adapted to suck a cleaning fluid, and a head portion 2a adapted to spray the cleaning fluid; and a spraying nozzle 3 of a synthetic resin fitted in a fitting hole 2c formed in one end of the head portion 2a. The fitting hole 2c of the head portion 2a is provided therein with a spherical recess 2d, as shown in FIG. 2B, in which the spraying nozzle 3 is rotatably supported.

The spraying nozzle 3 includes, as shown in FIGS. 1, 2A and 2B, a nozzle support 3a fitted rotatably in a spherical recess 2d of the device body 2, and a nozzle body 3b inserted and fixed in a recessed housing 3c of the nozzle support 3a.

As shown in FIG. 2A, the opening 3d of the recessed housing 3c of the nozzle support 3a is provided at the fluid supply side, and the bottom portion 3e thereof is provided with an oscillating ejection port 3f from which the spraying fluid from the nozzle body 3b is sprayed. The outer surface of the nozzle support 3a has a spherical portion 3g having an axis 23 extending through the centers of the opening 3d and ejection port 3f of the recessed housing 3c. As shown in FIGS. 2B and 2C, the spherical portion 3g and spherical recess 2d of the device body 2 are joined together to form a fitted pair, and the spherical portion 3g thereby becomes rotatable in a predetermined range around the center of the spherical recess 2d.

The nozzle body 3b is formed, as shown in FIG. 1, by joining two halves molded out of a synthetic resin by using a metal mold. The nozzle body 3b is integrated by laminating the two opposed divisional members on each other. To form the spraying nozzle 3, the nozzle body 3b is then press-fitted from the opening 3d of the nozzle support 3a into the recessed housing 3c and fixed therein, as shown in FIG. 2C.

A spraying flow passage in the spraying nozzle 3 thus formed includes, as shown in FIG. 2C, an introduction port 3i adapted to receive the cleaning fluid supplied from a supply passage 2e in the suction pipe portion 2b, a central flow passage 3k in which the cleaning fluid from this introduction port 3i flows, feedback flow passages 3m formed on both sides of the central flow passage 3k by partition walls 3h, and the ejection port 3f adapted to spray the cleaning fluid onto an object such as a windshield of an automobile. The central flow passage 3k widens out, and a part of the cleaning fluid flowing in the central flow passage 3k impinges upon the bottom portion 3e of the nozzle support 3a, circulates through the feedback flow passages 3m, 3m, and flows into the central flow passage 3k again. Thus, the central flow passage 3k and two feedback flow passages 3m, 3m form a flow passage for selfgenerated oscillation of the spraying cleaning fluid.

In a spraying angular variable washer nozzle device 1 formed as described above, the cleaning fluid flows up through the supply passage 2c, advances from the introduction port 3i of the spraying nozzle 3 into the selfgenerating oscillation flow passage, is subjected to selfgenerated lateral oscillation, and is dispersed and sprayed from the ejection port 3f, as shown in FIGS. 2A to 2C. When the cleaning fluid passes through the nozzle body 3b of the spraying nozzle 3, all of the cleaning fluid reaches the ejection port 3f, and the cleaning fluid does not leak to the outside from a portion of the device other than the ejection port 3f. The nozzle body 3b is made of two joined halves and housed in the nozzle support 3a from the cleaning fluid supply side, and thus there is no contact surface exposed to the outside. Therefore, the cleaning fluid does not leak from the surface at which the halves of the nozzle body 3 are combined together, and the leakage of the cleaning fluid is thereby prevented.

Figure 3A:
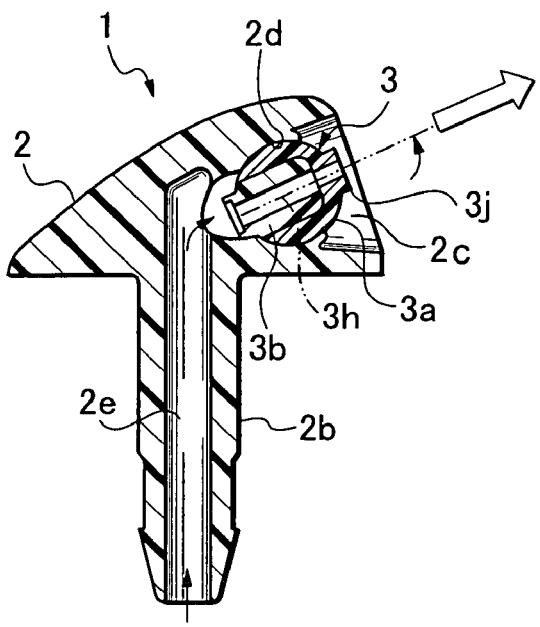
FIGS. 3A, 3B and 3C are longitudinal sectional views showing the modes of regulating the spraying angle of the cleaning fluid in the same spraying angular variable washer nozzle device.
Figure 3B:
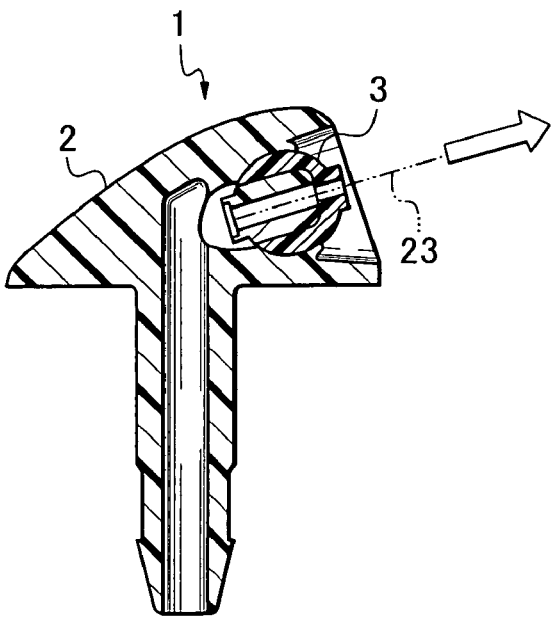
Figure 3C:
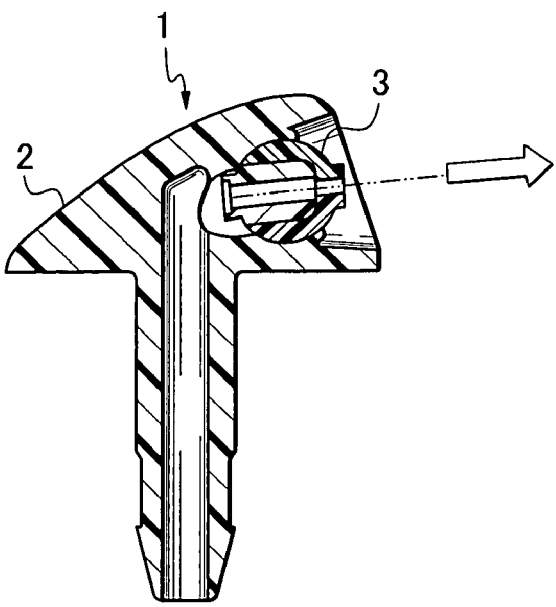
Figure 4A:
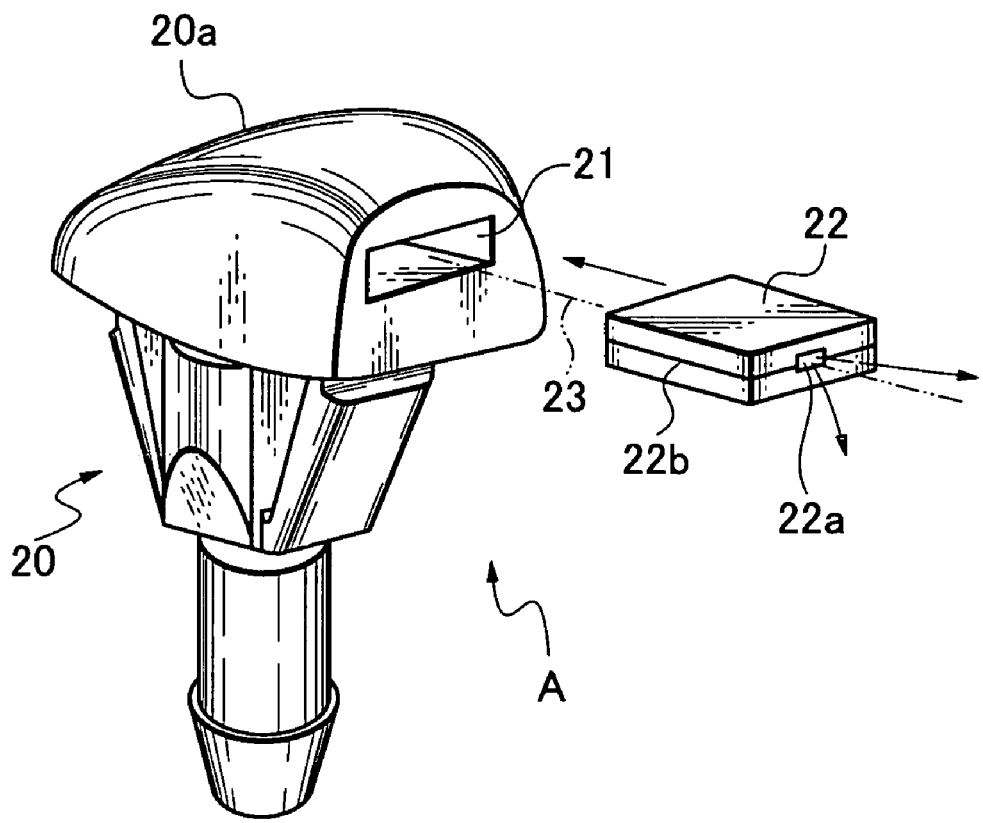
FIG. 4A is an exploded perspective view showing a prior art washer nozzle device.
Figure 4B:
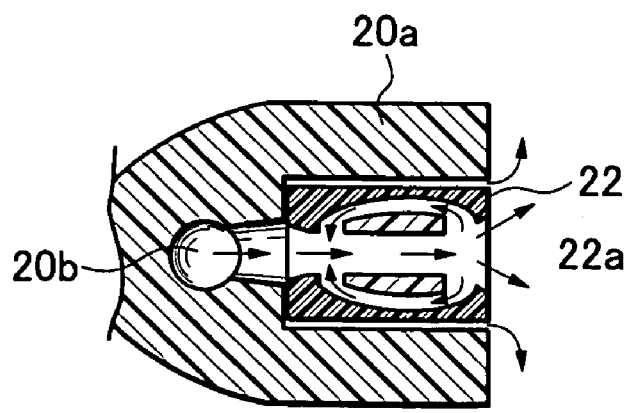
FIG. 4B is a plan view in section of a cleaning fluid flow path in the same device.

Since the spraying nozzle 3 is supported rotatably in the spherical recess 2d of the device body 2, when the spraying nozzle 3 is turned by a jig gripping angle regulating portion 3j, as shown in FIGS. 3A, 3B, and 3C, the angle of spraying of the cleaning fluid can be changed laterally or vertically away from the axis 23.

What is claimed is:

1. A spraying angular variable washer nozzle device comprising:
    a device body having a suction pipe portion adapted to suck in a cleaning fluid, and a head portion adapted to spray the cleaning fluid; and
    a spraying nozzle supported rotatably in a fitting hole formed at one end of the head portion;
    wherein the spraying nozzle is provided with a nozzle body having a spraying flow passage and a nozzle support having a recessed housing in which the nozzle body is inserted and fixed, the nozzle support being supported rotatably in the fitting hole of the head portion of the device body;
    wherein the recessed housing is provided with an opening at the side where the cleaning fluid is supplied and an ejection port at its bottom portion for spraying the cleaning fluid from the nozzle body;
    wherein the spraying flow passage is a self-generating oscillation flow passage; and
    wherein the nozzle support includes a spherical portion having an axis extending through the centers of the opening and ejection port of the recessed housing, and the fitting hole of the device body is provided therein with a spherical recess in which the spherical portion is rotatable fitted.

2. A spraying angular variable washer nozzle device according to claim 1,
    wherein the nozzle body includes two opposed integrally laminated divisional members, and the nozzle body is press fitted in the recessed housing of the nozzle support.

3. A spraying angular variable washer nozzle device according to claim 2,
    wherein the spraying flow passage includes an upstream side and a downstream side and is composed of an introduction port at the upstream side adapted to receive the cleaning fluid supplied from a supply passage in the suction pipe portion, a central flow passage in which the cleaning fluid from the introduction port flows, feedback flow passages formed between partition walls projected on both sides of the central flow passage and inner walls of the recessed housing respectively, and the ejection port at the downstream side to spray the cleaning fluid onto an object.

* * * * *